(12) United States Patent
Park et al.

(10) Patent No.: US 8,258,930 B2
(45) Date of Patent: Sep. 4, 2012

(54) APPARATUS, METHOD, AND MEDIUM FOR CONTROLLING DEVICES IN A REMOTE CONTROL SYSTEM

(75) Inventors: Tae-suh Park, Yongin-si (KR); Yeun-bae Kim, Seongnam-si (KR); Min-kyu Park, Seongnam-si (KR); Moon-sik Jeong, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1306 days.

(21) Appl. No.: 11/448,750

(22) Filed: Jun. 8, 2006

(65) Prior Publication Data

US 2007/0014199 A1    Jan. 18, 2007

(30) Foreign Application Priority Data

Jul. 18, 2005    (KR) ........................ 10-2005-0064955

(51) Int. Cl.
G08C 19/12    (2006.01)
(52) U.S. Cl. .................................. 340/13.24; 340/13.25
(58) Field of Classification Search ............. 340/825.69, 340/825.72
See application file for complete search history.

(56) References Cited

U.S. PATENT DOCUMENTS

| | | | |
|---|---|---|---|
| 5,028,919 A | | 7/1991 | Hidaka |
| 5,854,593 A | * | 12/1998 | Dykema et al. .......... 340/825.22 |
| 6,624,752 B2 | | 9/2003 | Klitsgaard et al. |
| 6,636,157 B1 | * | 10/2003 | Sato .......................... 340/825.22 |
| 2002/0021231 A1 | * | 2/2002 | Schlager et al. .............. 340/984 |
| 2004/0051638 A1 | | 3/2004 | Green |
| 2004/0090315 A1 | * | 5/2004 | Mackjust et al. ........ 340/426.13 |
| 2006/0124806 A1 | * | 6/2006 | Crowther ....................... 248/139 |
| 2006/0164208 A1 | * | 7/2006 | Schaffzin et al. ............ 340/5.64 |
| 2007/0194913 A1 | * | 8/2007 | Yokoshima et al. ..... 340/539.26 |

FOREIGN PATENT DOCUMENTS

| | | |
|---|---|---|
| JP | 63-290098 | 11/1988 |
| JP | 2-177797 | 7/1990 |
| KR | 2002-0008813 | 1/2002 |

* cited by examiner

*Primary Examiner* — Brian Zimmerman
*Assistant Examiner* — Omer S Khan
(74) *Attorney, Agent, or Firm* — Staas & Halsey LLP

(57) ABSTRACT

A remote control method and medium, a control device and a controlled device of a remote control system. The control device of the remote control system includes an identification information storage unit for storing identification information of the control device and attribute information on a single control function of one or more controlled devices controlled by the control device, a signal generation unit for generating a signal including the identification information and the attribute information, a switch unit for receiving a user's input and activating the signal generation unit, a modulation unit for modulating the generated signal into an omni-directional signal, a transmission unit for broadcasting the modulated signal to the one or more controlled devices, and an attachment unit, positioned on a back face of the control device, for attaching the control device thereto.

9 Claims, 7 Drawing Sheets

APPARATUS, METHOD, AND MEDIUM FOR CONTROLLING DEVICES IN A REMOTE CONTROL SYSTEM

CROSS-REFERENCE TO RELATED APPLICATIONS

This application claims the benefit of Korean Patent Application No. 10-2005-0064955 filed on Jul. 18, 2005 in the Korean Intellectual Property Office, the disclosure of which is incorporated herein in its entirety by reference.

BACKGROUND OF THE INVENTION

1. Field of the Invention

The present invention relates to a remote control method, medium, and system, and more particularly to a remote control method, medium, and system, in which the same control function of two or more controlled devices can be controlled with one remote control device by implementing the remote control system with a simple control device that performs a common single control function for different kinds of electronic devices or a combination thereof, and in which a mapping of the control device to functions of the controlled devices is simplified to provide convenience in use.

2. Description of the Related Art

Recently, with the increase of home electronics, various integrated remote controllers for controlling a plurality of electronic devices have appeared. In the case of a conventional integrated remote controller, a process is required that involves mapping control codes of electronic devices to be controlled to a control code of an integrated remote controller through a complicated button manipulation. Further, when remotely controlling a plurality of electronic devices, buttons must be manipulated after converting the present mode into a mode specifying a device to be controlled (controlled device), or buttons have to be allocated to the electronic devices and these allocated buttons are manipulated.

Such integrated remote controllers have been disclosed in many patents. For example, Japanese Patent No. S63-290098 discloses a learning remote control method and apparatus that can learn signals of remote control devices of other electronic devices, and thus can function as a general-purpose remote control.

However, such an integrated remote control device has problems in that it is difficult to provide a general purpose design that encompasses all the functions of the diverse electronic devices, the selection of a device to be controlled is unintuitive, and a complicated manipulation is required to control different functions.

SUMMARY OF THE INVENTION

Additional aspects, features, and/or advantages of the invention will be set forth in part in the description which follows and, in part, will be apparent from the description, or may be learned by practice of the invention.

The present invention solves the above-mentioned problems occurring in the prior art. One aspect of the present invention is to provide a general remote control method, medium and system that makes it possible to perform a control function of one or more controlled devices with a remote control device that provides a single control function, thereby providing convenience in use.

According to an aspect of the present invention, there is provided a remote control method and system that can simultaneously control specified functions of two or more controlled devices through one action by mapping one remote control device to the specified functions of the two or more controlled devices.

According to another aspect of the present invention, there is provided a user-oriented remote control method and system that provides only functions required by a user by selecting and arranging one or more remote control devices according to a user's need.

According to still another aspect of the present invention, there is provided a remote control method and system that provide a general-purpose remote control device that remotely controls two or more controlled devices in combination using one or more simple, low-cost switches, and thus can discard or replace the control device in the case of a loss of any specified control function or the failure of the switches.

According to another aspect of the present invention, there is provided a remote control method including generating a signal including identification information of a control device and attribute information on a single control function of one or more controlled devices controlled by the control device; modulating the signal into an omni-directional signal; transmitting the modulated signal to the controlled devices; receiving signals transmitted by one or more control devices; demodulating the received signals; extracting the identification information and the attribute information from the demodulated signal; and controlling the controlled devices according to the attribute information if the identification information and the attribute information are registered.

In another aspect of the present invention, there is provided a remote control method including receiving from one or more control devices an omni-directional signal including identification information of the control device and attribute information on a single control function of one or more controlled devices controlled by the control device; demodulating the signal; extracting the identification information and the attribute information from the demodulated signal; and controlling the controlled device according to the attribute information if the identification information and the attribute information are registered.

In still another aspect of the present invention, there is provided a control device of a remote control system including an identification information storage unit storing identification information of the control device and attribute information on a single control function of one or more controlled devices controlled by the control device; a signal generation unit generating a signal including the identification information and the attribute information; a switch unit receiving a user's input and activating the signal generation unit; a modulation unit modulating the generated signal into an omni-directional signal; a transmission unit broadcasting the modulated signal to the one or more controlled devices; and an attachment unit, positioned on a back face of the control device, for attaching the control device thereto.

In still another aspect of the present invention, there is provided a controlled device of a remote control system including a wireless receiving unit receiving from one or more control devices an omni-directional signal including identification information of the control device and attribute information on a single control function of one or more controlled devices controlled by the control device, demodulating the received signal, and extracting the identification information and the attribute information from the demodulated signal; a storage unit storing the identification information and the attribute information; and a control signal generation unit generating a control signal for controlling the controlled device according to the attribute information if the identification information and the attribute information are registered in the storage unit.

In still another aspect of the present invention, there is provided a control device of a remote control system including an identification information storage unit storing identification information of the control device and attribute information on a single control function of one or more controlled devices controlled by the control device; a signal generation unit generating a signal including the identification information and the attribute information; an input unit receiving a user's input and activating the signal generation unit; a modulation unit modulating the generated signal into an omni-directional signal; and a transmission unit broadcasting the modulated signal to the one or more controlled devices.

In still another aspect of the present invention, there is provided a controlled device of a remote control system including a wireless receiving unit receiving an omni-directional signal including identification information of a control device and attribute information on a single control function of the controlled device, demodulating the received signal, and extracting the identification information and the attribute information from the demodulated signal; a storage unit storing the identification information and the attribute information; and a control signal generation unit generating a control signal for controlling the controlled device according to the attribute information if the identification information and the attribute information of the control device are registered in the storage unit.

In still another aspect of the present invention, there is provided a remote control method including generating a signal including identification information of a control device and attribute information on a single control function of one or more controlled devices controlled by the control device; modulating the signal into an omni-directional signal; and transmitting the modulated signal to the one or more controlled devices, wherein each controlled device receives signals transmitted by the control device, demodulates the received signals, extracts the identification information and the attribute information from the demodulated signal, and controls the controlled device according to the attribute information if the identification information and the attribute information are registered in the controlled device In still another aspect of the present invention, there is provided a remote control method including receiving an omni-directional signal including identification information of a control device and attribute information on a single control function of a controlled device; demodulating the signal; extracting the identification information and the attribute information from the demodulated signal; and controlling the controlled device according to the attribute information if the identification information and the attribute information are registered in a storage unit.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
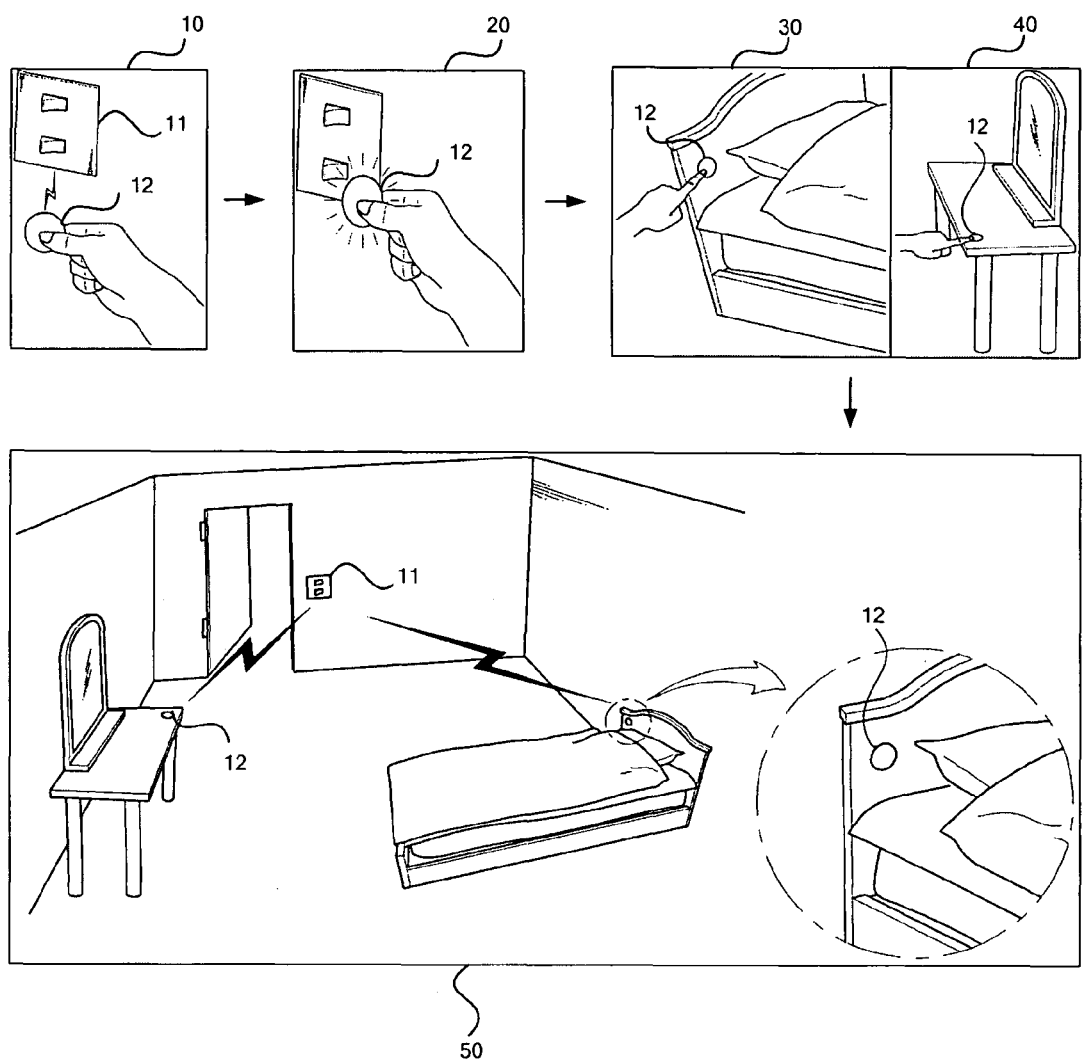
FIG. 1 is an exemplary view explaining the use of a control device of a remote control system after the control device is registered in controlled devices according to an exemplary embodiment of the present invention.

Reference will now be made in detail to exemplary embodiments of the present invention, examples of which are illustrated in the accompanying drawings, wherein like reference numerals refer to like elements throughout. Exemplary embodiments are described below to explain the present invention by referring to the figures.

FIG. 1 is an exemplary view explaining the use of a control device of a remote control system after the control device is registered in controlled devices according to an exemplary embodiment of the present invention.

If a user desires to remotely control the power of a bedroom lamp on a dressing table, he/she brings a power switch 12 near a bedroom lamp switch 11, and then presses the power switch (step 10). If the power switch 12 is registered in the bedroom lamp switch 11, the power switch 12 emits light or generates a sound effect for reporting the completion of the registration (step 20).

The registered power switch 12 is attached to a convenient location, for example, a bedside 30 or a dressing table 40, and if the user presses the power switch 12 at that location, the bedroom lamp is turned on/off (step 50). If a user wants to control a single function of one controlled device through a plurality of control devices attached to many places, the control devices are registered and attached to desired places.

Figure 2:
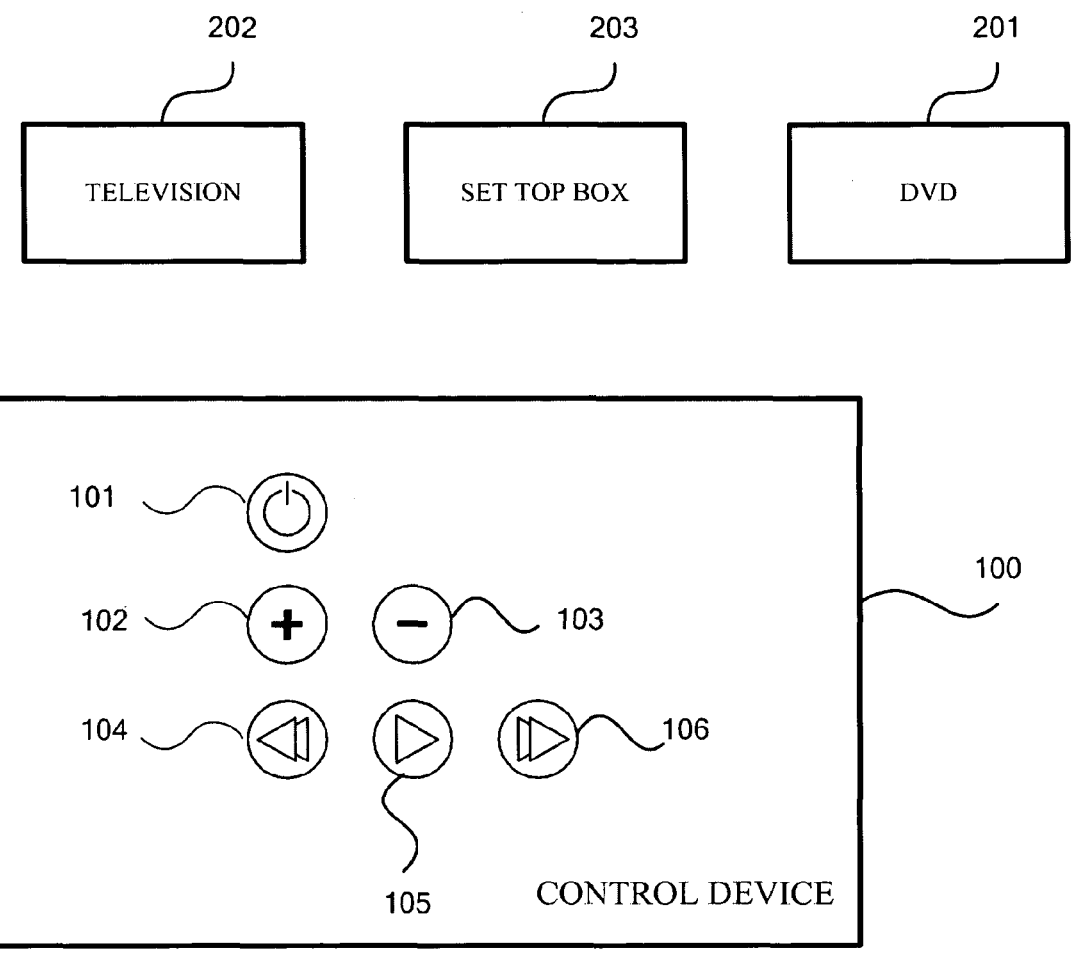
FIG. 2 is an exemplary view explaining a case of remotely controlling two or more controlled devices with a single control device.

FIG. 2 is an exemplary view explaining a case of remotely controlling two or more controlled devices with a single control device.

A control device 100 of a remote control system according to an exemplary embodiment of the present invention may include one or more switches such as a power switch 101, an up/increase switch 102, a down/decrease switch 103, a play switch 105, a back switch 104, a forward switch 106, and others.

For example, the power switch 101 controls a power on/off operation, which is a common control function in electronic appliances, and can serve as a TV switch or a DVD switch if it is mapped to a TV 202 or a DVD player 201. A symbol imprinted on the upper surface of the switch uses an icon that is common in the related art, and that symbolizes the power on/off. In another example, the up/increase switch 102 and the down/decrease switch 103 may control brightness, temperature, and volume if they are mapped to a lighting device, an air conditioner, or a TV, respectively. The playback-related switches 104 to 106 may be used to adjust channels or a timer if they are mapped to a TV or an air conditioner.

Hereinafter, a control device will be described as a remote control switch. However, it will be apparent to persons skilled in the art that the remote control switch is merely an exemplary embodiment of a control device, and thus it may include all types of control devices capable of receiving a user's input and transmitting a signal, such as a radio signal. It will also be apparent to persons skilled in the art that the above controlled devices are examples, and thus the controlled devices may include all types of controlled devices capable of receiving a signal, such as a radio signal, and controlling the device based on the signal.

A process of controlling the power of a TV 202 using such a remote control device with a single function will be explained in the following.

First, a user places an on/off switch 101 near the TV 202 that the user desires to register as a partner of the switch, and presses a button of the switch. If the on/off switch has been registered as a partner of the TV, the TV or the on/off switch informs the user of the registration state through a light or sound emission. The user then attaches the on/off switch registered in the TV as a power control switch to a convenient location such as a bed or a desk, and presses the switch to easily turn on/off the TV.

FIG. 2 shows a case where one or more control switches providing a single function are registered in a DVD player 201, a TV 202, and a set top box 203 so that the three controlled devices can be remotely controlled by one control device 100. For example, if one on/off switch 101 is mapped to the power management function of the DVD player 201, the TV 202 and the set top box 203, the user can simultaneously turn on/off the DVD player, the TV and the set top box by pressing the on/off switch 101.

Further, if the control switches 101 to 106 are mapped to a corresponding control function of the DVD player 201, and are respectively attached to the convenient locations, the functions of the DVD player can be remotely controlled through a user's manipulation of any of the control switches. Thus, an adhesive layer, such as a Post-it®, or a magnet may be attached to a back face of the control switch so as to allow the control switch to be attached to any location easily and detachably.

If a user presses one of the control switches 101 to 106, the corresponding switch converts its identification information and attribute information, for example, a power, up/increase, down/decrease, back, forward, and others, into a pulse modulation signal, e.g., a pulse width modulation (PWM) signal, converts the post modulation signal (e.g., PWM signal) into an inaudible signal such as an electromagnetic wave or an ultrasonic wave, and transmits the same to the controlled device. That is, if the user presses the on/off switch 101, the on/off switch 101 converts its identification information and attribute information on the performance of a power management function into a post modulation signal (e.g., PWM signal), and broadcasts the post modulation signal (e.g., PWM signal) after modulating it into an electromagnetic wave or an ultrasonic wave. The DVD player within range of the corresponding signal demodulates the received signal to extract the identification information of the switch from the received signal. As a result, if the switch is a registered one, the DVD considers the received signal as a command for controlling a power of the DVD according to the attribute information (e.g., attribute or attributes) received together with the identification information (e.g., identifier or identifiers).

Meanwhile, if the on/off switch 101 has been registered in both the TV 202 and the DVD player 201, the user can simultaneously turn on/off the DVD and TV with one manipulation of the on/off switch. On the contrary, if two or more on/off switches 101 have been registered so as to control the power of the TV 202, the user can turn on/off the power of the TV using any of the switches after attaching the on/off switches to some locations where the user stays mainly. In addition, the user can make a user-oriented remote control device while assembling only switches corresponding to functions of the controlled devices that are generally used according to the use pattern of the controlled devices. The controlled device can be any electrical appliance. For example, in FIG. 2, a convenient remote control device is provided which is composed of only switches for controlling a power on/off function, a volume adjusting function, and a content playback related function among various functions of the DVD.

The remote control system according to an exemplary embodiment of the present invention may be realized by various means whose exemplary embodiments will be explained with reference to FIGS. 3 and 4.

Figure 3:
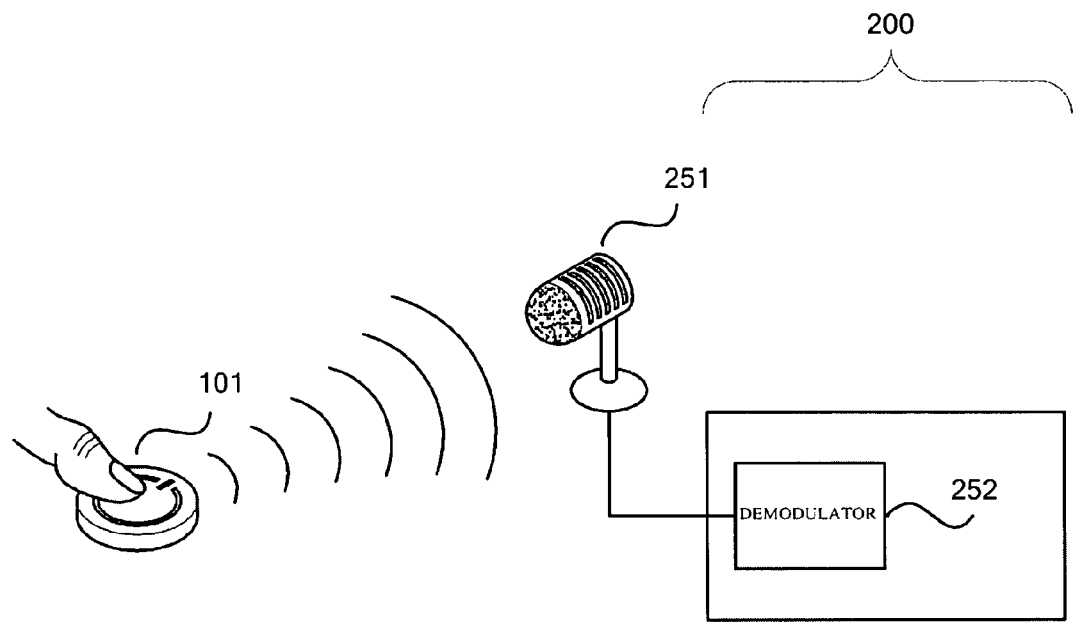
FIG. 3 is a view illustrating a remote control system according to a first exemplary embodiment of the present invention.

FIG. 3 is a view illustrating a remote control system according to a first exemplary embodiment of the present invention.

In FIG. 3, the identification information of a control device is stored in an identification information storage unit such as a read only memory (ROM). If a user operates a switch, the identification information of the control device stored in the storage unit and the attribute information are converted into a PWM signal, which is in turn modulated into an ultrasonic signal and transmitted to a controlled device 200 to be controlled. The controlled device 200 receives the ultrasonic signal through an ultrasonic microphone 251, and demodulates the received ultrasonic signal to extract the identification information and attribute information of the switch from the signal, thereby performing a corresponding control function.

For example, if the control device is an on/off switch 101, the control device (on/off switch 101) stores bit information "0010 011000110100", in which the power attribute and the identifier of the switch are combined, in an identification information storage unit. When the on/off switch 101 is pressed, it converts the bit stream into a pulse modulation signal, e.g., a PWM signal. Then, the control device modulates the PWM signal into an ultrasonic signal, and transmits the ultrasonic signal to the controlled device. The controlled device 200 to be controlled receives the ultrasonic signal through an ultrasonic microphone 251, demodulates the received signal to extract a bit stream from the signal using demodulator 252 (demodulation unit), and then recognizes from the bits "0010" that the signal is related to the power and has been transmitted from a control switch whose identifier is "011000110100". Then, it is checked whether this bit information is an identifier of a control device registered as a partner of the corresponding controlled device, and if it is the registered one, the power of the controlled device 200 is controlled.

Figure 4:
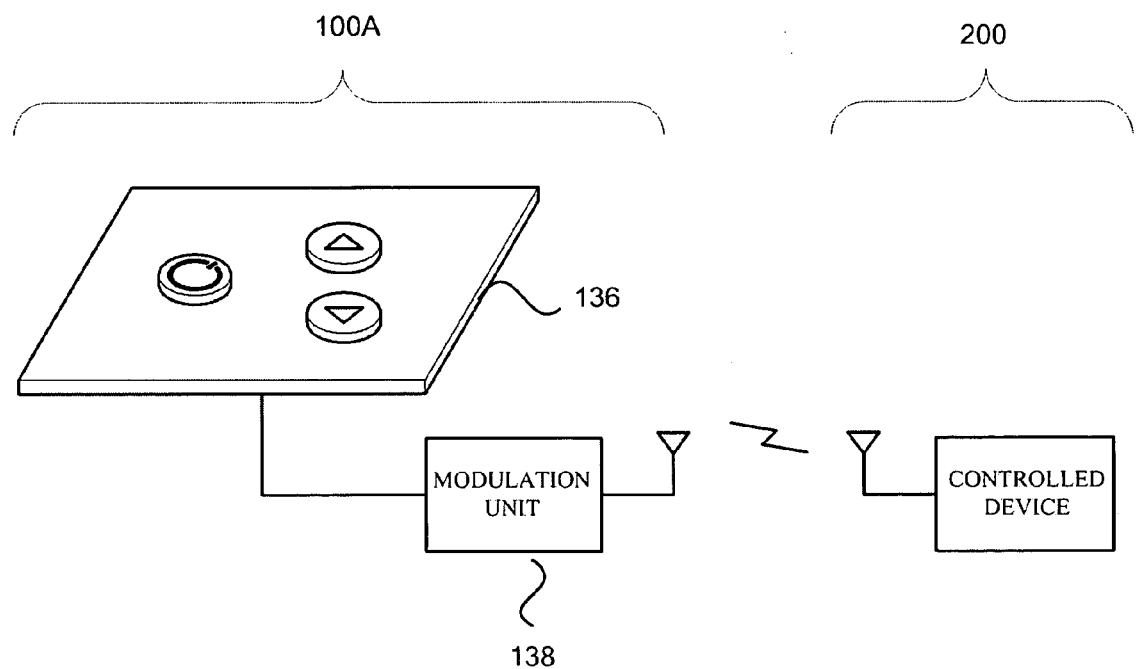
FIG. 4 is a view illustrating a remote control system according to a second exemplary embodiment of the present invention.

FIG. 4 is a view illustrating a control device according to another exemplary embodiment of the present invention, which is embodied using radio frequency identification (RFID) technology.

The control device 100A of FIG. 4 has its own identification information in the form of an RFID tag, and is attached to an RFID reader 136 in the form of a pad. In this case, the control device 100A is embodied in a passive RFID tag. The control device 100A, activated by the switch pressed by the user, generates a signal for its own RFID, using an induced current that is generated by an electric field of the RFID reader as its power. The RFID reader 136 reads the RFID signal and transmits it to a modulation unit 138 (modulator), which in turn modulates the RFID signal into inaudible signal such as an electromagnetic wave and transmits the inaudible signal such as an electromagnetic wave to the controlled device 200 to be controlled. In the case of using the passive RFID technology as illustrated in FIG. 4, a radio transmission unit and a power source, which consume a large power and the miniaturization of which is difficult, are shared so as to reduce the manufacturing cost. In this case, it has advantages in that the cost of the control switch is reduced, and no battery is required for each control switch. The RFID reader is not limited to the type of a pad 136 as shown in FIG. 4, but may include a wearable computing device such as a watch type computing device.

Meanwhile, it is possible to embody a control device in an active RFID tag that generates an RFID signal with its own power. In this case, if a user presses a switch of the control device, the control device generates a high-power RFID signal using its own power source, and the RFID reader attached to the controlled device, which is separated at least a few meters from the control device, reads and transmits the RFID signal to the modulation unit.

Figure 5:
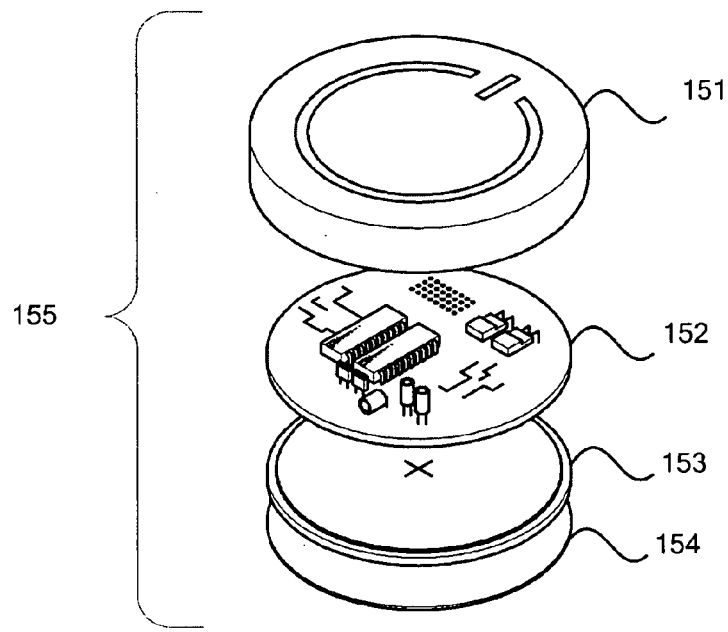
FIG. 5 is an exemplary view illustrating the hardware construction of a control device according to an exemplary embodiment of the present invention.

FIG. 5 is a view illustrating a hardware construction of a control device according to an exemplary embodiment of the present invention. The control device 155 shown in FIG. 5 is a button switch type including a switch layer 151, a layer 152 having a memory storing identification information and attribute information and a radio transmission unit, a battery layer 153, and an attachment layer 154. This construction is merely one exemplary embodiment of the control device so that, for example, the battery layer 153 may be omitted depending on the employed technology, and an attachment layer 154 may be formed with a magnet or in the form of an easily releasable adhesive surface such as a Post-it®.

Meanwhile, the control device according to an exemplary embodiment of the invention may further include an output unit for informing the user of the result of registration in a controlled device and information on the controlled devices mapped onto the control device. For example, a light emitting diode (LED) or a mini-speaker can be used as the output unit.

Figure 6:
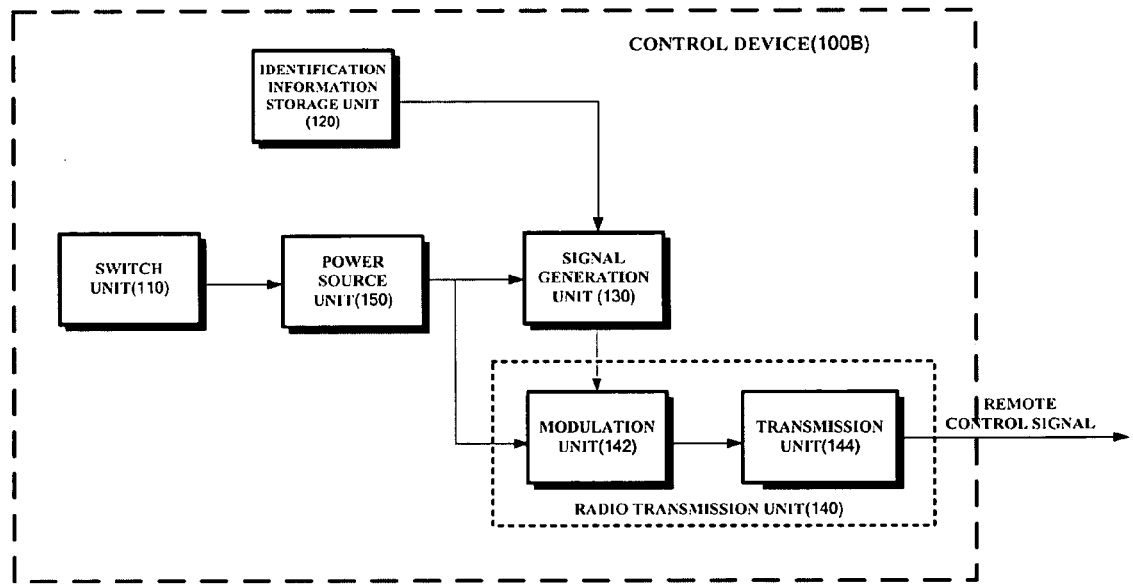
FIG. 6 is a block diagram illustrating the construction of a control device of a remote control system according to an exemplary embodiment of the present invention.

FIG. 6 is a block diagram illustrating a construction of a control device of a remote control system according to an exemplary embodiment of the present invention.

The remote control device 100B of the present exemplary embodiment may include a switch unit 110, an identification information storage unit 120, a signal generation unit 130, a radio transmission unit 140, and a power source unit 150.

The switch unit 110 serves to activate the signal generation unit 130 and the radio transmission unit 140 through the power source unit 150 in accordance with a user's input. The switch unit 110 may be a general electric contact switch. However, the switch unit is not limited thereto, but may include any device or devices whose control function can be activated with the user's manipulation.

The identification information storage unit 120 is a storage medium for storing the identification information and attribute information of the control device 100, and may be a ROM, an electrically erasable programmable read only memory (EEPROM), or a combination of general analog passive devices. However, a ROM, EEPROM, and analog passive devices are examples, and the storage medium is not limited to these examples. The storage medium may be any storage device or devices capable of storing identification information.

The signal generation unit 130 reads from the identification information storage unit 120 a bit stream including the identification information and attribute information of the control device and modulates the information when an activation signal is inputted through the power source unit 150 by the switch unit 110. Preferably, the signal generated as the result of modulation has a format that facilitates the discrimination of signals on a single channel. For this, the signal may be pulse-modulated. When the identification information and attribute information of the control device are in the form of the RFID tag as illustrated in FIG. 4, the signal generation unit 130 reads and transmits the RFID tag to the modulation unit 142.

The radio transmission unit 140 may include the modulation unit 142 and a transmission unit 144. The radio transmission unit 140 modulates and broadcasts the signal transmitted from the signal generation unit 130 when an activation signal is inputted from the switch unit 110 through the power source unit 150. The modulation unit 142 transmits the signal including the identification information and attribute information of the control device transmitted from the signal generation unit 130 to the controlled device 200 to be controlled through an omni-directional transfer medium. Herein, the omni-directional transfer signal means an electromagnetic wave or a sound wave in an inaudible range that a user cannot recognize. Instead of an infrared (IR) type remote control device that was used while aiming at one controlled device to be controlled in the prior art, the control device uses an omni-directional transfer signal to secure a high degree of freedom on the installation and location of the control device.

The transmission unit 144 broadcasts the signal modulated by the modulation unit 142 to one or more controlled devices 200.

The control device according to the present exemplary embodiment may further include a power source unit 150. The power source unit 150 may be implemented using a general dry cell, and may include self-generating means. When the control device is embodied in an RFID tag, the control device may not require a separate independent power source unit.

Meanwhile, in order to inform a user of the result of registration to a controlled device and information on the controlled devices mapped onto a control device, the control device according to another exemplary embodiment may further include a receiving unit for receiving such information from the controlled device, and an output unit for outputting the received information to the user. The output unit may be implemented by an LED, which may emit light with the same color as the controlled device, or may display an icon symbolizing the controlled device, if the registration is successful. However, if the registration is not successful, the output unit may emit light with a specific color indicating the failure of registration. In addition, the output unit may inform of information on the registration result or the registered controlled device using sound effect.

Figure 7:
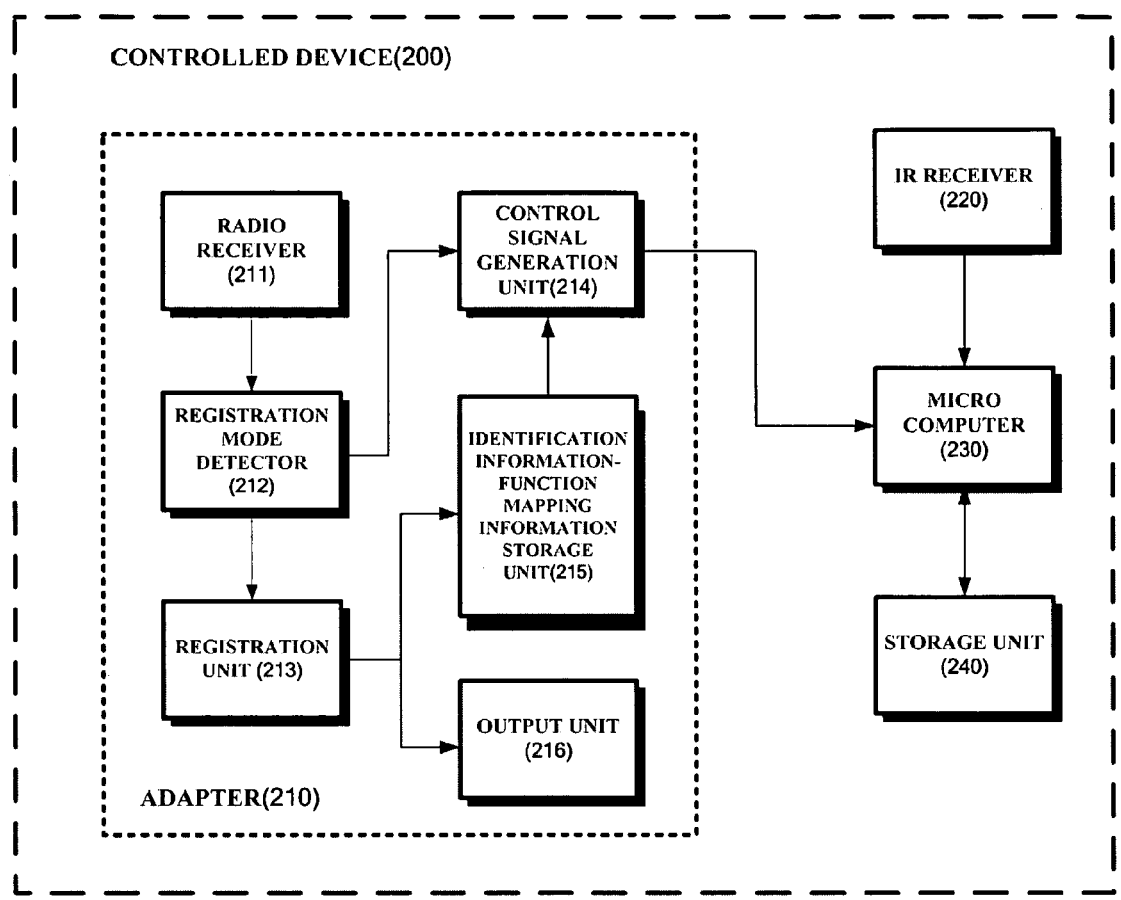
FIG. 7 is a block diagram illustrating a construction of a controlled device of a remote control system according to an exemplary embodiment of the present invention.

FIG. 7 is a block diagram illustrating the construction of a controlled device of a remote control system according to the present invention.

The controlled device 200 to be controlled may include an adapter 210, an IR receiver 220, a microcomputer 230, and a storage unit 240. The adapter 210 serves to convert the signal transmitted by a control device into a control signal for controlling the controlled device, in order to remotely control the existing controlled device by a control device 100 according to the present exemplary embodiment. The adapter 210 receives a signal transmitted by the control device, and extracts the identification information and attribute information of the control device from the signal. Then, the adapter generates a control signal according to the control function of the controlled device mapped onto the identification information and the attribute information, and transmits the control signal to the microcomputer 230. At this time, if a signal generated by a control signal generation unit 214 has a converted format that is understandable by an electronic device embodied in the conventional IR remote control device technology, the present invention can be applied to conventional home electronics only comprising the IR receiver 220, the microcomputer 230, and the storage unit 240, without any great modification thereof. The adapter 210 includes a radio receiver 211, a registration mode detector 212, a registration unit 213, an identification information function mapping information storage unit 215, a control signal generation unit 214, and an output unit 216.

The radio receiver 211 receives an omni-directional transfer signal transmitted by the control device 100, and demodulates the received signal. The registration mode detector 212 checks whether the signal received by the radio receiver 211 is a control device registration signal or a controlled device operation signal. In the case of the control device registration mode, the registration mode detector 212 transmits the demodulated signal to the registration unit 213, and in the case of the controlled device operation mode, the registration mode detector 212 transmits the demodulated signal to the control signal generation unit 214.

Checking whether the received signal is a registration signal can be performed by detecting the intensity of the received inaudible signal, or a specified keyword contained in the received signal. In other words, when the intensity of the inaudible signal is over a predetermined level, or when a keyword indicating a registration mode is included in the signal, the registration mode detector 212 considers the received signal as a registration signal.

When the registration unit 213 checks the attribute information of the control device transmitted from the registration mode detector 212 to determine that the control device can be interlinked with a function supported by controlled device, the registration unit 213 records the corresponding identification information and attribute information in the identification information-function mapping information storage unit 215. If the registration is successful, the user can be informed of the result of registration through the output unit 216, such as by light-emitting or generating sound effect that indicates the successful registration.

The identification information-function mapping information storage unit 215 is a read/write storage medium for storing the identification information of the control device mapped onto a specified function of the controlled device, and a flash RAM or an EEPROM included in the controlled device is typically used as the storage unit. However, a flash RAM and EEPROM are examples, and the storage unit is not limited to these examples. The storage unit may be any storage device or devices capable of storing identification information of the control device mapped onto a specified function of the controlled device.

The control signal generation unit 214 checks whether the identification information of the control device transmitted from the registration mode detector 212 has been registered in the identification information-function mapping information storage unit 215. If it has been registered, it generates a signal for controlling the control function of the controlled device to which the identification information is mapped, and finally transmits the signal to the microcomputer 230.

The output unit 216 can inform a user of the registration result of the control device by emitting light or generating sound effect.

The adapter 210 corresponds to an additional hardware for adapting a control device according to an exemplary embodiment of the present invention to existing IR type remote control device based home electronics. Accordingly, in order to support a remote control function by a conventional integrated remote control device as well as the remote control according to an exemplary embodiment of the present invention, the controlled device 200 to be controlled may further include an IR receiver 220 for receiving a signal from an existing integrated remote control device, and a microcomputer 230 for practically controlling the controlled device according to a control code stored in the storage unit 240. The IR receiver 220 can be omitted if the control device according to an exemplary embodiment of the invention is applied to new electronic appliances instead of the existing electronic appliances.

The respective constitutional elements as illustrated in FIGS. 6 and 7 may mean software or hardware such as a field-programmable gate array (FPGA) or an application-specific integrated circuit (ASIC). The constituent elements may be constructed so as to be in a storage medium that can be addressed or to execute one or more processors. The functions provided in the constituent elements may be performed by subdivided constituent elements, and the constituent elements and functions provided in the constituent elements may be combined together to perform a specified function. In addition, the constituent elements may be implemented so as to execute one or more computing devices or computers in a system.

Figure 8:
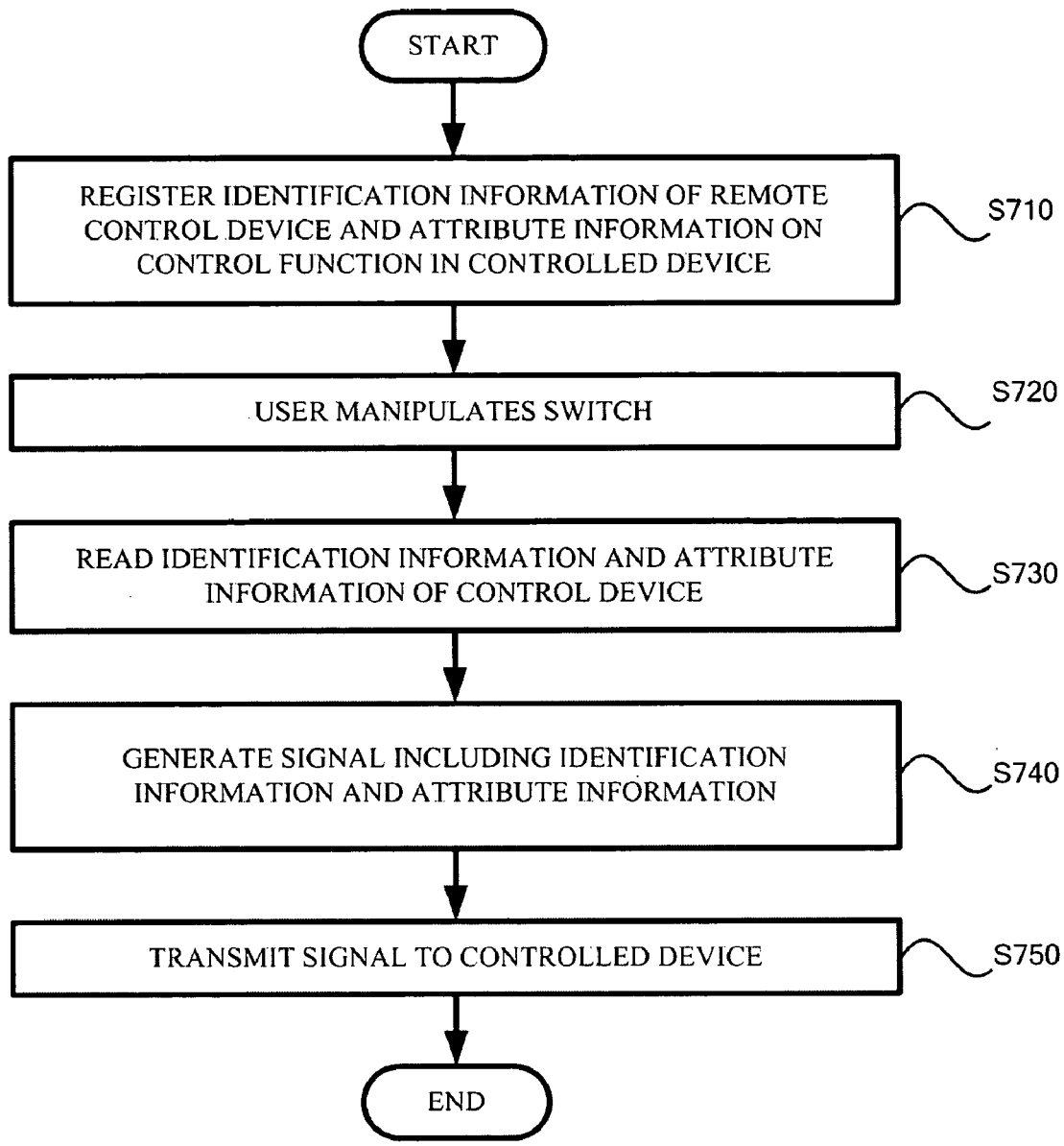
FIG. 8 is a flowchart illustrating a remote control process viewed from a control device side according to an exemplary embodiment of the present invention.

FIG. 8 is a flowchart illustrating a procedure of a remote control method, which is viewed from a control device side, according to an exemplary embodiment of the present invention.

If a user presses a switch S720 after a control device registers its own identification information and attribute information in a controlled device S710, the control device reads the identification information and the attribute information included in the control device S730. Then, the control device generates a signal including the identification information and the attribute information on a control function that can be performed by the control device S740, and transmits the signal to the controlled device after modulating the signal S750.

The control device registration step S710 may be performed in such a manner that the user puts the control device near the controlled device to be registered and presses a button, or otherwise a particular key word indicating a registration signal is interleaved in a signal. The signal generating and modulating method is the same as described in FIG. 6.

Figure 9:
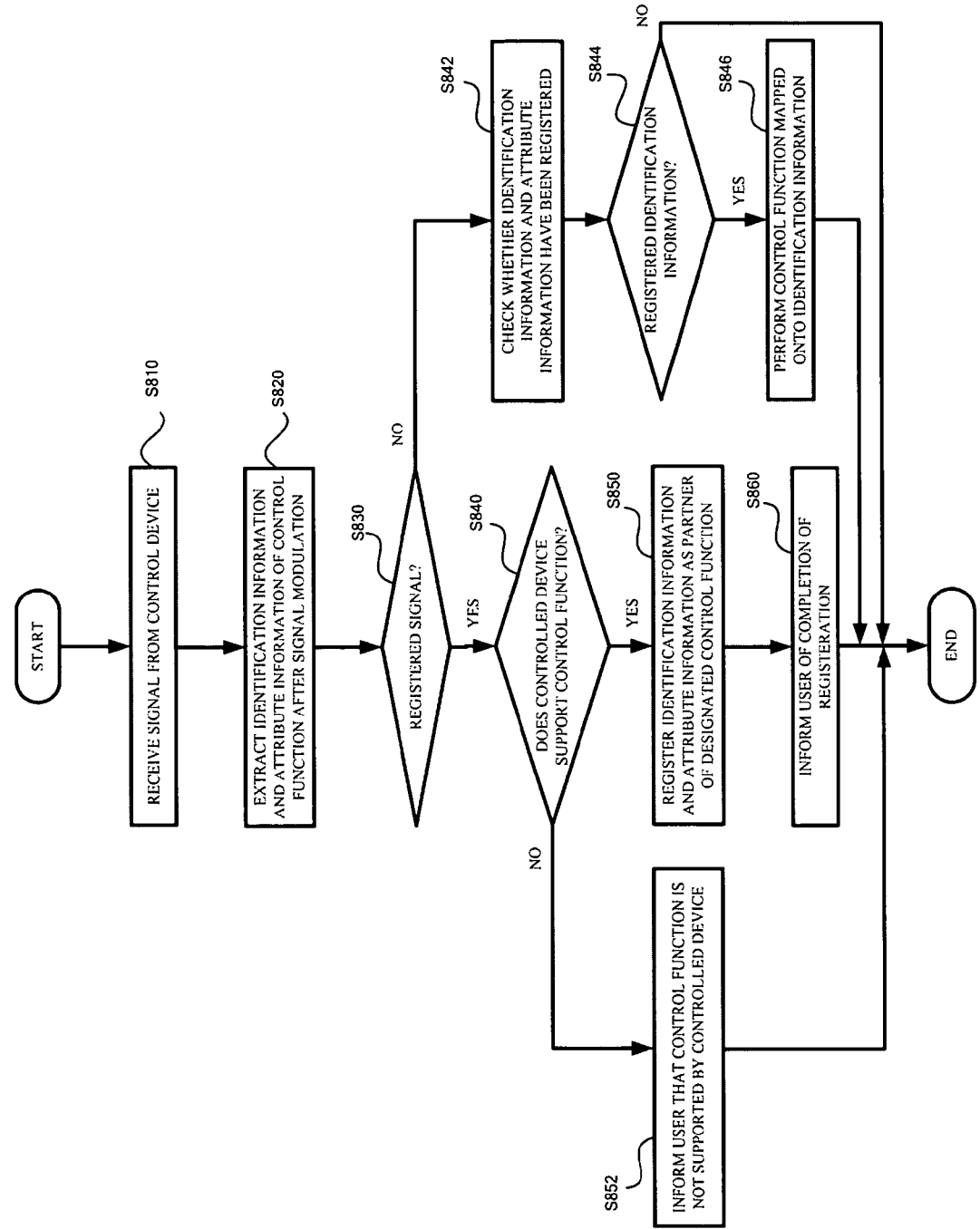
FIG. 9 is a flowchart illustrating a remote control process viewed from a controlled device side according to an exemplary embodiment of the present invention.

FIG. 9 is a flowchart illustrating a procedure of a remote control method, which is viewed from the side of a controlled device, according to an exemplary embodiment of the present invention.

When a signal is received from a control device 100 S810, a controlled device 200 according to an exemplary embodiment of the invention demodulates the signal to extract identification information and attribute information on a control function from the signal S820. If the received signal is one for registering a control device (YES in S830) as the result of checking whether the received signal is a registration signal S830, the controlled device determines whether the controlled device supports a control function corresponding to the attribute information S840. If the controlled device supports the control function (YES in S840), it registers the identification information of the control device as a partner of a specified control function S850, and then informs the user of the registration completion S860. On the contrary, if the controlled device does not support the function that the control device desires to register (NO in S840), the controlled device informs the user that the control function is not supported by the controlled device S852.

The step S830 of checking whether the received signal is a registration signal determines that the received signal is a registration signal if the intensity of the received signal is over a predetermined level, or the signal includes a keyword indicating the registration signal. Here, the predetermined level of intensity is preferably determined by an experiment because the intensity differs according to an implementation method such as the sensitivity of the radio receiving unit.

Meanwhile, if the received signal is a signal for operating a controlled device (NO in S830), the identification information of the control device that transmits the signal is checked so as to inquire whether the control device is a registered one S842. If the control device is a registered one (YES in S844), a control function is performed that is mapped onto the identification information S846.

The steps S852 and S860 of informing the user of the registration result provide the user with information on whether the registration has been completed or has failed using a light-emitting device or sound-output means.

In addition to the above-described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code.

The computer readable code/instructions can be recorded/transferred in/on a medium in a variety of ways, with examples of the medium including magnetic storage media (e.g., floppy disks, hard disks, magnetic tapes, etc.), optical recording media (e.g., CD-ROMs, or DVDS), magneto-optical media (e.g., floptical disks), hardware storage devices (e.g., read only memory media, random access memory media, flash memories, etc.) and storage/transmission media such as carrier waves transmitting signals, which may include instructions, data structures, etc. Examples of storage/transmission media may include wired and/or wireless transmission (such as transmission through the Internet). Examples of wired storage/transmission media may include optical wires and metallic wires. The medium/media may also be a distributed network, so that the computer readable code/instructions is stored/transferred and executed in a distributed fashion. The computer readable code/instructions may be executed by one or more processors.

As described above, the remote control method, medium and system according to exemplary embodiments of the present invention as described above produce one or more of the following effects.

First, by mapping one or more control devices to a single controlled device, a user can easily control the controlled device using the control devices attached to various convenient locations.

Second, by mapping a signal remote control device to a specified function of two or more controlled devices, the user can simultaneously control the specified function of the two or more controlled devices using one device.

Third, since the process of mapping the control devices to the specified function of the controlled devices is intuitive, no separate learning process is required.

Fourth, a set of control devices that provide only control functions desired by a user with a combination of the control devices controlling a single function.

Fifth, no mode conversion for selecting a controlled device is required when controlling plural controlled devices, and this creates a convenient system.

Finally, by using a combination of modularized control devices that provide a single control function instead of an integrated remote controller, a low-priced remote control system can be provided.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A control device of a remote control system, comprising:
an identification information storage unit storing identification information of the control device and storing attribute information that is capable of being checked by each of one or more controlled devices to determine that the control device can be interlinked with a single control function supported by the respective one or more controlled devices, the one or more controlled devices capable of being controlled by a control device that has been registered;
a signal generation unit capable of generating a control device registration signal including the identification information and the attribute information and a controlled device operation signal;
a switch unit receiving a user's input and activating the signal generation unit;
a modulation unit modulating either a generated control device registration signal or a controlled device operation signal into an omni-directional signal;
a transmission unit broadcasting the modulated signal to the one or more controlled devices that determines whether the received signal is a control device registration signal to register the control device or a controlled device operation signal; and
an attachment unit, positioned on a back face of the control device, for attaching the registered control device to a fixed location selected by the user,
wherein the signal generation unit generates the control device registration signal that is determined by the controlled device as a signal for registering the control device based on the intensity of the signal.

2. The control device of claim 1, further comprising:
a receiving unit receiving information on the result of registration of the control device from the one or more controlled devices; and
an output unit outputting the result of the registration to a user.

3. A controlled device of a remote control system, comprising:
a wireless receiving unit capable of receiving from one or more control devices both an omni-directional signal including identification information of the control device and attribute information to determine that the control device can be interlinked with a single control function supported by a respective one of the one or more controlled devices capable of being controlled by a registered control device, demodulating the received signal, determining whether the received signal is a control device registration signal or a controlled device operation signal, and extracting the identification information and the attribute information from the demodulated signal;

a storage unit storing the identification information and the attribute information upon determining that the control device can be interlinked with a single control function;

a control signal generation unit generating a control signal for controlling the controlled device according to the attribute information if the identification information and the attribute information are registered in the storage unit; and a registration unit registering the identification information and the attribute information if the omni-directional signal has an intensity above a predetermined level.

4. The controlled device of claim 3, further comprising an output unit outputting a registration result to a user.

5. A remote control method, comprising:

generating a control device registration signal including identification information of a control device and attribute information capable of being checked by each of one or more controlled devices to determine that the control device can be interlinked with a single control function supported by a respective one or more controlled devices that are capable of being controlled by a registered control device;

modulating the control device registration signal into an omni-directional signal;

transmitting the modulated signal to the controlled devices;

receiving signals transmitted by one or more control devices;

demodulating the received signals;

determining whether a received signal is a control device registration signal or a controlled device operation signal;

extracting the identification information and the attribute information from the demodulated signal; and upon the received signal determined to be a control device registration signal, registering the control device upon determining that the control device can be interlinked with a single control function, and upon the received signal determined to be a controlled device operation signal, controlling the controlled devices according to the attribute information if the identification information and the attribute information are registered, wherein the received signal is determined to be a registration signal based on an intensity of the signal.

6. The remote control method of claim 5, further comprising:

receiving information on the result of the registration of the control device from the one or more controlled devices; and outputting the registration result to a user.

7. The remote control method of claim 5, further comprising the controlled devices outputting the registration result of the control device to a user.

8. A remote control method comprising:

receiving from one or more control devices an omni-directional signal including identification information of the control device and attribute information;

determining whether the received signal is a control device registration signal or a controlled device operating signal; demodulating the signal;

extracting the identification information and the attribute information from the demodulated signal;

upon the received signal determined to be a control device registration signal, registering the control device upon determining that the control device can be interlinked with a single control function, and upon the received signal determined to be a controlled device operation signal, controlling the controlled device according to the attribute information if the identification information and the attribute information are registered further comprising registering the identification information and the attribute information if the omni-directional signal has the intensity above a predetermined level.

9. The remote control method of claim 8, further comprising outputting the result of the registration to a user.

* * * * *